(12) United States Patent
Zhou et al.

(10) Patent No.: US 9,361,616 B2
(45) Date of Patent: Jun. 7, 2016

(54) ONE-SCAN AND ONE-TOUCH PAYMENT AND BUYING USING HAPTIC CONTROL VIA MESSAGING AND CALLING MULTIMEDIA SYSTEM ON MOBILE AND WEARABLE DEVICE, CURRENCY TOKEN INTERFACE, POINT OF SALE DEVICE, AND ELECTRONIC PAYMENT CARD

(71) Applicants: Dylan T X Zhou, Tiburon, CA (US); Tiger T G Zhou, Tiburon, CA (US); Andrew H B Zhou, Tiburon, CA (US)

(72) Inventors: Dylan T X Zhou, Tiburon, CA (US); Tiger T G Zhou, Tiburon, CA (US); Andrew H B Zhou, Tiburon, CA (US)

( * ) Notice: Subject to any disclaimer, the term of this patent is extended or adjusted under 35 U.S.C. 154(b) by 0 days.

(21) Appl. No.: 14/979,613

(22) Filed: Dec. 28, 2015

(65) Prior Publication Data
US 2016/0110695 A1    Apr. 21, 2016

Related U.S. Application Data

(63) Continuation-in-part of application No. 13/875,311, filed on May 2, 2013, now abandoned, and a continuation-in-part of application No. 13/620,775, filed on Sep. 15, 2012, now abandoned, and a
(Continued)

(51) Int. Cl.
*G06Q 20/38* (2012.01)
*G06Q 20/32* (2012.01)
*G06Q 20/34* (2012.01)

(52) U.S. Cl.
CPC ............ *G06Q 20/382* (2013.01); *G06Q 20/322* (2013.01); *G06Q 20/356* (2013.01); *G06Q 20/388* (2013.01)

(58) Field of Classification Search
CPC . G06Q 20/382; G06Q 20/356; G06Q 20/322; G06Q 20/388
See application file for complete search history.

(56) References Cited

U.S. PATENT DOCUMENTS

| | | | | |
|---|---|---|---|---|
| 2002/0049644 A1* | 4/2002 | Kargman | ............... | G06Q 20/20 705/26.1 |
| 2003/0177068 A1* | 9/2003 | Fujimoto | ............. | G06Q 20/105 705/18 |
| 2004/0078332 A1* | 4/2004 | Ferguson | ............... | G06Q 20/04 705/41 |
| 2004/0122746 A1* | 6/2004 | Charlier | ............. | G06Q 30/0641 705/27.1 |

(Continued)

*Primary Examiner* — Daniel Walsh
(74) *Attorney, Agent, or Firm* — Georgiy L. Khayet (57) ABSTRACT

Provided are computer implemented methods and systems for messaging, calling, and one-touch and one-scan payments and buying via mobile and wearable devices. An exemplary system comprises a processor and a database in communication with the processor. The processor is configured to provide a haptic control associated with the system. The haptic control is shown on a display of a mobile and wearable device overlapping other visual elements. The haptic control provides mode selection elements associated with a payment, messaging, and calling modes. The processor receives a selection of the payment mode via the mode selection elements from a user. Upon the selection, context is extracted from the display. Based on the context, a payment transaction type which the user intends to perform is determined. The payment transaction type includes a payment receiving transaction and a payment sending transaction. Based on the determining, a transaction request is sent to a financial institution using the extraction.

25 Claims, 6 Drawing Sheets

Related U.S. Application Data continuation-in-part of application No. 13/661,207, filed on Oct. 26, 2012, and a continuation-in-part of application No. 13/760,214, filed on Feb. 6, 2013, now Pat. No. 9,016,565, and a continuation-in-part of application No. 13/973,146, filed on Aug. 22, 2013, now Pat. No. 9,153,074, and a continuation-in-part of application No. 13/646,706, filed on Oct. 7, 2012, and a continuation-in-part of application No. 13/287,279, filed on Nov. 2, 2011, now abandoned, and a continuation-in-part of application No. 13/185,491, filed on Jul. 18, 2011, and a continuation-in-part of application No. 14/165,826, filed on Jan. 28, 2014, and a continuation-in-part of application No. 14/458,791, filed on Aug. 13, 2014, now Pat. No. 9,098,190, and a continuation-in-part of application No. 14/695,256, filed on Apr. 24, 2015, now Pat. No. 9,100,493, and a continuation-in-part of application No. 14/815,988, filed on Aug. 1, 2015, which is a continuation-in-part of application No. 12/749,412, filed on Mar. 29, 2010, now abandoned, and a continuation-in-part of application No. 14/034,509, filed on Sep. 23, 2013, which is a continuation-in-part of application No. 10/677,098, filed on Sep. 30, 2003, now Pat. No. 7,702,739.

(60) Provisional application No. 60/415,546, filed on Oct. 1, 2002.

(56) References Cited

U.S. PATENT DOCUMENTS

| | | | | |
|---|---|---|---|---|
| 2005/0055309 | A1* | 3/2005 | Williams | G06Q 30/02 705/40 |
| 2006/0230123 | A1* | 10/2006 | Simmons | G06Q 30/0603 709/219 |
| 2009/0259549 | A1* | 10/2009 | Winand | G06Q 30/0235 705/14.35 |
| 2009/0271265 | A1* | 10/2009 | Lay | G06Q 20/0453 705/14.38 |
| 2009/0313109 | A1* | 12/2009 | Bous | G06Q 30/02 705/14.31 |
| 2010/0022270 | A1* | 1/2010 | Mikkelsen | G06Q 30/0603 455/556.1 |
| 2010/0191608 | A1* | 7/2010 | Mikkelsen | G06Q 30/0601 705/26.1 |
| 2011/0022980 | A1* | 1/2011 | Segal | G06F 3/0488 715/810 |
| 2011/0307331 | A1* | 12/2011 | Richard | G06Q 30/0246 705/14.45 |
| 2012/0123924 | A1* | 5/2012 | Rose | G06Q 20/12 705/35 |
| 2012/0130866 | A1* | 5/2012 | Cooke | G06Q 30/0643 705/27.2 |
| 2013/0031593 | A1* | 1/2013 | Booth | H04N 21/4314 725/110 |
| 2013/0179336 | A1* | 7/2013 | Lyons | G06Q 20/30 705/39 |
| 2015/0277681 | A1* | 10/2015 | Isaacson | G06Q 30/0625 705/26.8 |
| 2015/0278922 | A1* | 10/2015 | Isaacson | G06Q 30/0633 705/26.8 |

* cited by examiner

ONE-SCAN AND ONE-TOUCH PAYMENT AND BUYING USING HAPTIC CONTROL VIA MESSAGING AND CALLING MULTIMEDIA SYSTEM ON MOBILE AND WEARABLE DEVICE, CURRENCY TOKEN INTERFACE, POINT OF SALE DEVICE, AND ELECTRONIC PAYMENT CARD

CROSS-REFERENCE TO RELATED APPLICATIONS

This application is a continuation-in-part of U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/661,207, entitled "METHODS AND SYSTEMS FOR RECEIVING COMPENSATION FOR USING MOBILE PAYMENT SERVICES," filed on Oct. 26, 2012, U.S. patent application Ser. No. 13/760,214, entitled "WEARABLE PERSONAL DIGITAL DEVICE FOR FACILITATING MOBILE DEVICE PAYMENTS AND PERSONAL USE," filed on Feb. 6, 2013, U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND," filed on Aug. 22, 2013, U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES," filed on Oct. 7, 2012, U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, and U.S. patent application Ser. No. 13/185,491, entitled "FACILITATING MOBILE DEVICE PAYMENTS USING PRODUCT CODE SCANNING," filed on Jul. 18, 2011, U.S. patent application Ser. No. 14/165,826, entitled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK," filed on Jan. 28, 2014, U.S. patent application Ser. No. 14/458,791, entitled "SYSTEMS AND METHODS FOR MESSAGING, CALLING, DIGITAL MULTIMEDIA CAPTURE AND PAYMENT TRANSACTIONS", filed on Aug. 13, 2014, U.S. patent application Ser. No. 14/695,256, entitled "WEARABLE PERSONAL DIGITAL DEVICE FOR FACILITATING MOBILE DEVICE PAYMENTS AND PERSONAL USE", filed on Apr. 24, 2015, U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 12/749,412, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Mar. 29, 2010, and U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, which is Continuation-in-Part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in its entirety.

FIELD

This application relates generally to data processing, and more specifically to methods and systems for one-touch and one-scan buying and paying performed via a mobile and wearable device.

BACKGROUND

Mobile payments generally refer to payment operations performed via a mobile or wearable device. The operations performed via mobile and wearable devices may include electronic commerce transactions, retail purchasing, micropayments, and other daily payments. Mobile payments may utilize credit cards, debit cards, gift cards, and virtual currencies. While mobile payments facilitate and stimulate the trade, the procedure of providing financial details and authenticating of identity may be tedious and time-consuming. Therefore, the convenience of mobile payments for daily micropayments is hindered.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for messaging, calling, and one-touch and one-scan payments and buying via a mobile and wearable device. Using the methods or systems described herein a user may perform facilitated electronic payments from any location. For this purpose, the user may register with the messaging, calling, and one-touch and one-scan payment and buying system. During the registration the user may provide his financial information. The financial information may include bank account information, credit card information, debit card information, gift card information, prepaid card information, insurance account information, merchant account information, mobile currency information, digital money account, SDK payment information, in-app payment information, social networking payment information, prepaid card information, API payment information, mobile account payment information, mobile currency information, and so forth. When required, the user may activate a haptic control associated with a messaging, calling, and one-touch and one-scan payment and buying system. The haptic control may be displayed over the video output of the device and overlap other applications or pages. The haptic control may provide for mode selection elements associated with a payment mode, a messaging mode, a calling mode, and a multimedia capture mode. Through the haptic control the messaging, calling, and one-touch and one-scan payment and buying system may receive the selection of the payment mode via the mode selection elements of the haptic control from a user. Upon the selection, context may be extracted from the display of the mobile and wearable device. Based on the context, a payment transaction type which the user intends to perform may be determined. The payment transaction type may include a payment receiving transaction and a payment sending transaction. Based on the determining, a transaction request may be generated using data of the extraction and the financial information of the user provided during the registration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for messaging, calling, and one-touch and one-scan payments and buying via a mobile and wearable device are described herein. The described system enables a user to make and request payments using a mobile device by one touch. To facilitate access to the system, the user initiates the system. When the system is initiated, a one-touch button is shown on a display of the mobile device on top of other applications and/or widgets. The one-touch button has at least three controls to activate messaging, calling, or one-touch and one-scan payment. One-touch payment control, when activated, determines whether the user intends to make a payment or to request a payment by the context in view on the display and performs the corresponding operation. Such accelerated payment procedure may facilitate electronic purchases and stimulate electronic trade.

Figure 1:
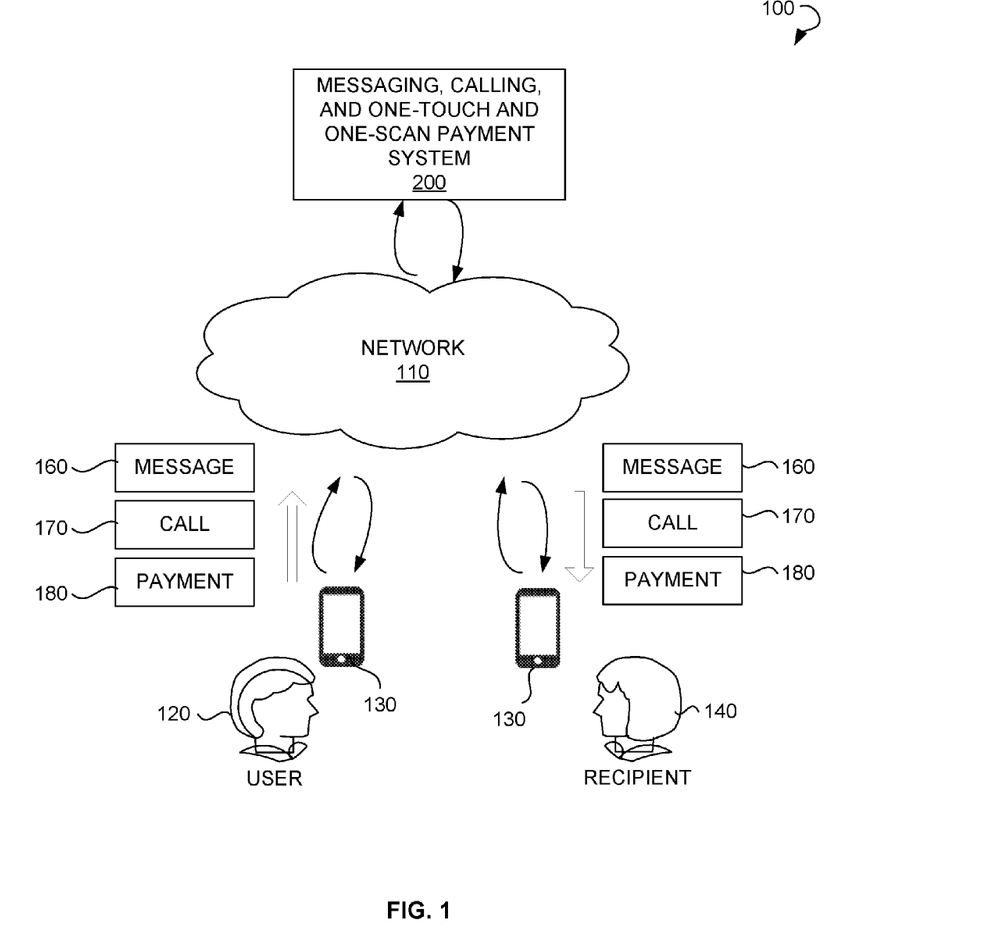
FIG. 1 is a block diagram showing an environment within which a system for messaging, calling, and one-touch and one-scan payment and buying system and a method of using thereof can be implemented, in accordance with an example embodiment.

Referring now to the drawings, FIG. 1 illustrates an environment 100 within which messaging, calling, and one-touch and one-scan payment and buying system and a method of using thereof can be implemented. The environment 100 may include a user 120, a client device 130, network 110, a messaging, calling, and one-touch and one-scan payment and buying system 200. On a user request, the messaging, calling, and one-touch and one-scan payment and buying system 200 may provide a haptic control on a display of the client device 130. The haptic control may include, for example, a one-touch button. The client device 130 may include a smart phone, a tablet PC, a lap top, an augmented reality glasses, a smart watch, and so forth.

Via the haptic control, the user 120 may exchange messages 160 with a recipient 140, make calls 170, and perform or request one-touch and one-scan payments 180. The messages 160, calls 170, and one-touch and one-scan payments 180 are transmitted to the system 200 and further to the recipient 140 or payee (not shown) via the network 110 using the client device 130.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients.

Figure 2:
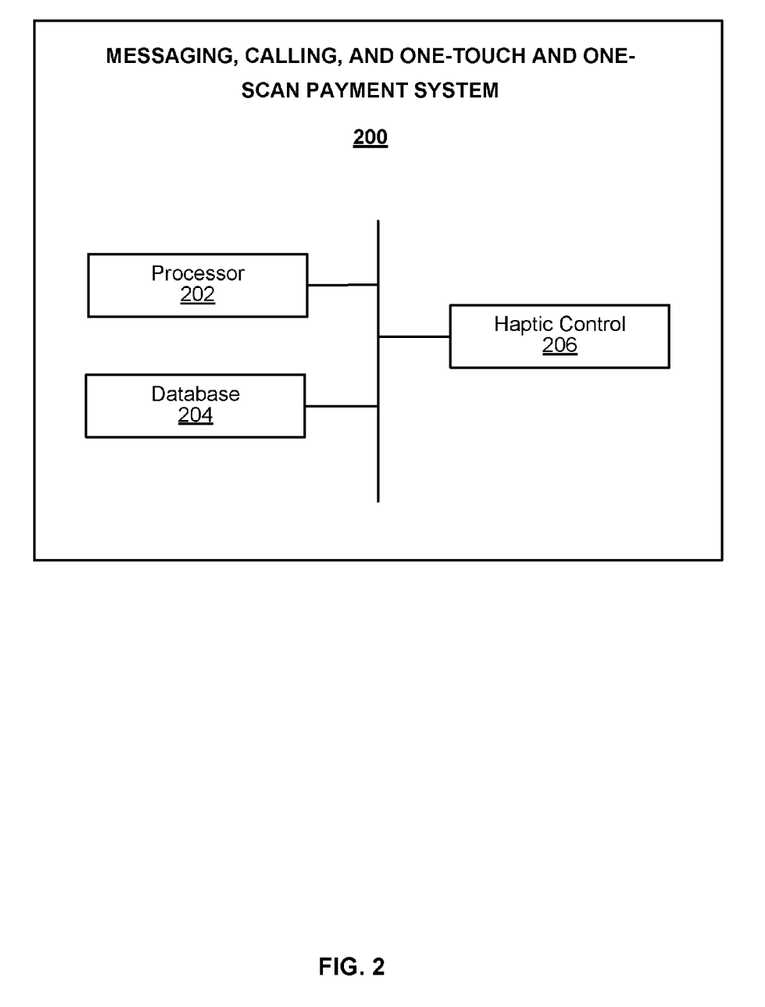
FIG. 2 is a block diagram showing various modules of the messaging, calling, and one-touch and one-scan payment and buying system, in accordance with certain embodiments.

FIG. 2 is a block diagram showing various modules of the messaging, calling, and one-touch and one-scan payment and buying system 200, in accordance with certain embodiments. The system 200 may comprise a processor 202 a database 204, and a haptic control 206. The processor 202 may include a programmable processor, such as a microcontroller, central processing unit (CPU), and so forth. In other embodiments, the processor 202 may include an application-specific integrated circuit (ASIC) or programmable logic array (PLA), such as a field programmable gate array (FPGA), designed to implement the functions performed by the system 200. Thus, the processor 202 may provide a haptic control associated with a messaging, calling, and one-touch and one-scan payment and buying system. The haptic control may be represented, for example, by a one-touch button shown on a display of a mobile and wearable device. The haptic control may overlap other visual elements on the display so that the haptic control was always visible for the user and not hidden by other screens. In some embodiments, the haptic control 206 may be integrated with a mobile application associated with the mobile and wearable device and/or the system 200. The haptic control may provide mode selection elements associated with a payment mode, a messaging mode, a calling mode, and multimedia capture mode. The processor 202 may further receive the selection of the payment mode via the mode selection element of the haptic control 206 from a user. When the payment mode is selected, the processor may extract context from the display of the mobile and wearable device. The context may include information on a web page, an application screen, or a message in view on the display. For example, the context may include a check-out page of an online shop. Based on the context, the processor 202 may determine a payment transaction type (i.e. a payment receiving transaction or a payment sending transaction) which the user intends to perform. For this purpose, the processor 202 may parse the context and identify key words associated with a specific payment transaction type. For instance, the payment sending transaction may be associated with the following key words: "check-out," "cart," and so forth. According to the determined transaction, a transaction request may be sent to a financial institution using the information extracted from the context and financial information of the user stored in the database 204. The financial information may include one or more of the following: bank account information, credit card information, debit card information, gift card information, prepaid card information, insurance account information, merchant account information, mobile currency information, and digital money. In some embodiments, the transaction request may be associated with a virtual currency.

The transaction request may be sent without requesting financial information, authorizing, or confirmations from the user. However, in some embodiments, the user, with the help of options of the system 200, may select to receive a confirmation request before sending the transaction request. When this option is selected, a confirmation request associated with the transaction request may be provided to the user on the display before the transaction request is transmitted.

Furthermore, the user may select a messaging mode via the mode selection elements of the haptic control 206. Then, the processor may provide a messaging interface on the display of the mobile and wearable device. When a message and a choice of a recipient is received from the user via the messaging interface, the processor 202 may send the message to the recipient via a data network.

If the calling mode is selected via the haptic control 206, the processor 202 may provide a calling interface on the display of the mobile and wearable device. Via the calling interface, the processor 202 may receive a call recipient from the user and initiate a data network call to the call recipient. The data network call may be made via a free Voice over IP (VoIP) service, a free Over-the-Top (OTT) service, and so forth.

If the multimedia mode is selected via the haptic control 206, the processor 202 may initiate one or more sensors to capture multimedia to obtain captured multimedia. The processor 202 may analyze a duration of the single touch to the section element of the one-touch button associated with the multimedia capture mode. Based on the analysis, the processor 202 may determine a type of the captured multimedia to be recorded: an image and a video recording. For example, if the duration of the single touch to the section element of the one-touch button associated with the multimedia capture mode is one second, the captured multimedia may be processed to generate an image, if the duration is more than one second, a video recording may be produced. The video recording may be captured while the single touch to the section element of the one-touch button associated with the multimedia capture mode lasts. The captured multimedia may be recorded to the database.

Figure 3:
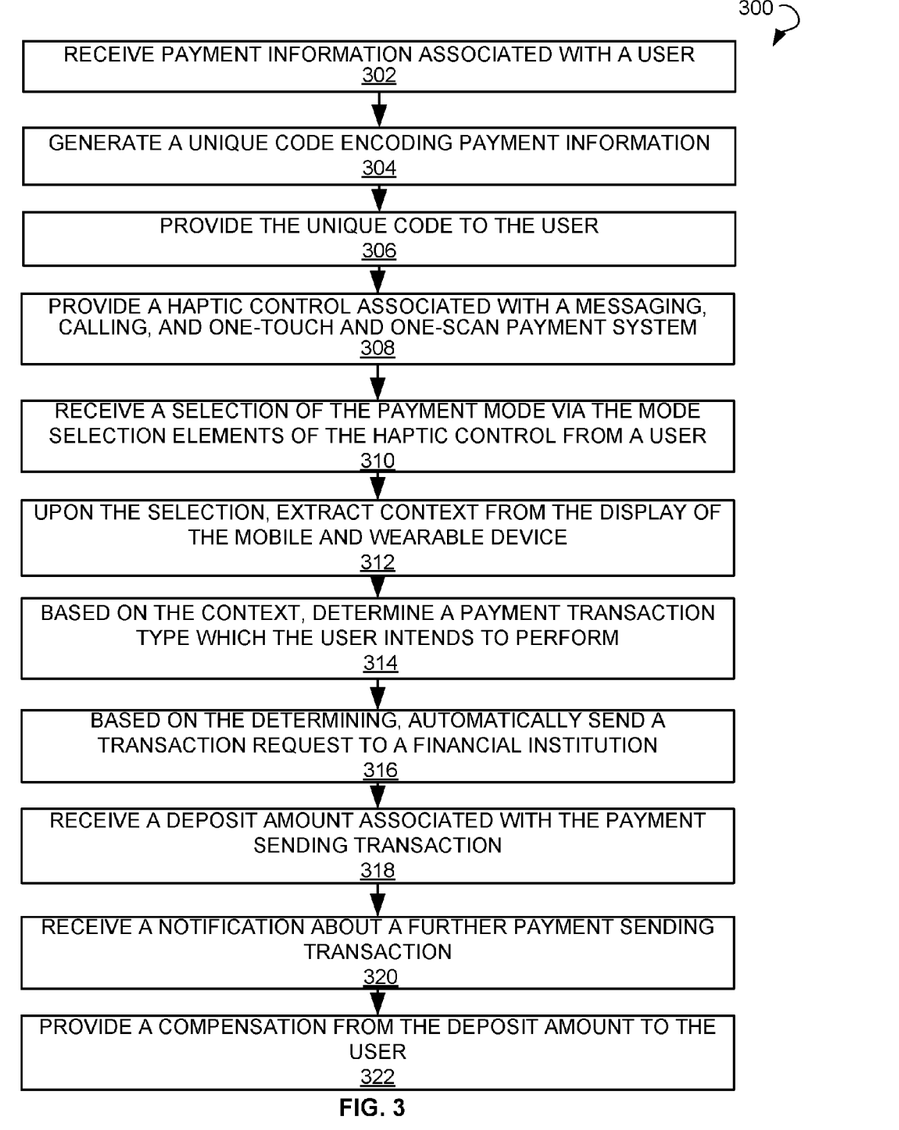
FIG. 3 is a flow chart illustrating a method for messaging, calling, and one-touch and one-scan payments and buying via a mobile and wearable device, in accordance with certain embodiments.

FIG. 3 is a flow chart illustrating a method 300 for messaging, calling, and one-touch and one-scan payments and buying via a mobile and wearable device, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the system 200 for providing compensation for using a mobile payment service, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 302 with receiving payment information associated with a user. The payment information may be also associated with a mobile payment account of the user in a messaging, calling, and one-touch and one-scan payment and buying system. At operation 304, a unique code encoding the payment information is generated. The unique code is provided to the user at operation 306.

At operation 308, the method continues with providing a haptic control on the display of the mobile and wearable device. The haptic control includes mode selection elements associated with a payment mode, a messaging mode, a calling mode, and a multimedia capture mode. The haptic control may be providing on receiving a request to initiate the haptic control from the user. To initiate the haptic control, the user may be prompted to provide a password, a code, a voice command, biometric data, and so forth. The user may interact with the haptic control by touch to a specific area of the haptic control associated with one of the mode selection elements. Additionally, the selection of the activity mode may include a voice command, a move command, and so forth. When the user touches one of the mode selection elements, the system determines which of the elements was touched.

At operation 310, a selection of the payment mode via the mode selection elements of the haptic control is received from the user. Upon the selection, context is extracted from the display at operation 312. Information from the screen in view on the mobile and wearable device and be captured and analyzed to identify the context. Based on the context, a payment transaction type to be performed may be determined at operation 314. Thus, it may be determined whether the user is performing a payment or requesting a payment based on the information on the display of the mobile and wearable device.

Based on the determining of the payment transaction type, a transaction request associated with the determined payment transaction type may be sent at operation 316. The transaction request may include the extracted information and/or financial data and authorizing data associated with the user. The financial data and authorizing data may be provided by the user during registration and stored by the messaging, calling, and one-touch and one-scan payment and buying system. The financial information may include bank account information, credit card information, debit card information, gift card information, prepaid card information, insurance account information, merchant account information, mobile currency information, digital money, and so forth. The transaction request may be sent to a financial operation for processing. The financial organization performing the payment may be a bank, a credit company, a virtual currency system, and so forth.

If the transaction request is associated with the payment sending transaction, a deposit amount associated with the payment sending transaction related to the user may be received at operation 318. Further, at operation 320, a notification about a further payment sending transaction of the user may be received via the mobile payment service. The notification may include at least the unique code and a payment amount of the further payment sending transaction. Based on the notification, a compensation, a rebate, a cashback, and/or a reward may be provided to the user from the deposit amount. The compensation, the rebate, the cashback, and/or the reward may be associated with the payment amount associated with the further payment sending transaction and may amounts o a predetermined percent from the payment amount.

Furthermore, if the messaging mode is selected via the haptic control, the system 200 of FIG. 2 may provide to the user a messaging interface on the mobile and wearable device. Through the messaging interface a message may be received from the user and sent to a recipient via a data network. The message may include a text, an audio, a video, and geographical data. Additionally, messages may be received from other users. The haptic control may notify the user that one or more messages were received. The user may activate the messaging interface to read and/or reply to the messages.

If the calling mode is selected, a calling interface may be provided to the user. The user may select a call recipient in his contacts and make a call request. The system 200 may receive the call request from the user. Based on the call request, the system 200 may initiate a data network call. The call may include an audio call, a video call, a holographic video call, and so forth. The call may be performed via a Voice over IP (VoIP) service, a free Over-the-Top (OTT) service, and so forth. The free VoIP service and the free OTT service include voice communication, fax, text messaging, voice messaging, video communication, and multimedia transmission. In various embodiments, the free VoIP service and the free OTT service are provided via Wi-Fi, 3G network, 4G network, 5G network, 6G network or upper.

On selection of the multimedia mode, one or more sensors may be initiated to capture multimedia to obtain captured multimedia. A duration of the single touch to the section element of the one-touch button associated with the multimedia capture mode may be analyzed. Based on the analysis, a type of the captured multimedia may be determined: an image and a video recording. When the type if determined, the captured multimedia may be recorded to the database according to the type determined based on the duration. For instance, if the duration of the single touch to the section element of the one-touch button associated with the multimedia capture mode is one second, an image is recorded to the database, if the duration is more than one second, a video recording may be stored to the database.

In an example embodiment, the system 200 may authenticate an identity of the user. The authentication may include one or more of the following: a password authentication, a voice authentication, and a biometric authentication. The biometric authentication may include one or more of a fingerprint authentication, an iris pattern authentication, a heartbeat authentication, a vein pattern identification, and so forth. The vein pattern identification may be performed using scanning of one or more of the following: a palm vein pattern, a wrist vein pattern, a hand vein pattern, a leg vein pattern, a foot vein pattern, a neck vein pattern, and a head vein pattern of the user. The fingerprint authentication may include scanning fingerprints swiped across one or more or the following: a screen of the mobile and wearable device, a button of the mobile and wearable device, a rear panel of the mobile and wearable device, and so forth.

In an example embodiment, the system 200 may receive, based on the determining of the payment transaction type which the user intends to perform, data of a payment card associated with the user. The data of the payment card may be received by scanning the payment card. The payment card may be scanned by a camera of the mobile and wearable device by positioning the payment card in proximity to camera of the mobile and wearable device. The payment card may be associated with one or more of the following: a bank account of the user, a virtual currency account of the user, and the like. The bank account of the user and the virtual currency account of the user may be linked to a mobile and wearable device number.

In an example embodiment, the data of the payment card may be stored into a cloud network. In some embodiments, the data of the payment card may be stored in the cloud network as a token.

In some embodiments, the transaction request may include a unique code associated with the user. The unique code may encode at least bank account information of the user and a payment amount. In further embodiments, the unique code may be displayed on the mobile and wearable device for scanning by the merchant.

In a further example embodiment, the system 200 may receive product data based on scanning of the product data by the mobile and wearable device associated with the user. The product data may be associated with one or more products. Upon receiving of the scanning, the system 200 may calculate a total price for the one or more products. Furthermore, merchant data may be received. In some embodiments, the merchant data may be received by scanning a code associated with the merchant. A scanned code associated with the merchant may include at least a Quick Response (QR) code associated with the merchant. The QR-code associated with the merchant can be stored in the mobile and wearable device of the user. The QR-code associated with the merchant may encode at least a merchant account number. In further embodiments, the transaction request may comprise at least the total price and the merchant data.

The system 200 may determine that the total price for the one or more products exceeds a predetermined price. Based on the determining, the system 200 may send a notification to a merchant.

In some embodiments, the transaction request may include at least a user phone number. In such a case, the payment sending transaction may include sending a payment from a phone account of the user to a merchant account.

In further embodiments, the payment receiving transaction and the payment sending transaction may be performed by pairing of the mobile and wearable device and a merchant device using a reader. The reader may be connected to the merchant device and plugged into the mobile and wearable device.

In some embodiments, the mobile application associated with the mobile and wearable device and the system 200 may be integrated into a software development kit and an operating system of the mobile and wearable device. The operating system may be selected from iOS, Android, and Windows Phone. Upon launch of the mobile application by the user, the user may be prompted to log in and asked to provide a consent that the mobile application may initiate future payments on behalf of the user. Additionally, during further purchases the mobile application may be launched by default without a need for a further action (such as entering a login and a password by the user) from the user to initiate launching of the mobile application. The mobile application may associated with performing payments and buying products or services in the Internet.

Thus, one-touch and one-scan payment and buying features may improve buying experience for customers and merchant. Additionally, for the user that pays and buys products and services using the mobile application associated with one-touch and one-scan payment and buying, the number of taps and times the user is required to enter a user login (identification number) and a password for future purchases may be minimized.

In some embodiments, upon launching of the at least one mobile application by the user, a list of payment cards may be provided for selection by the user. The payment cards may be associated with one or more of the following: a bank account, a bank mobile account, a service provider account, a digital currency, a universal national currency token interface, a national digital currency, an electric payment card, and the like. Upon the selection, a token may be sent to the mobile and wearable device. The token may be associated with a selected payment card, and further payments may be performed using the token.

In further embodiments, the processor of the system 200 may be further configured to download applications, receive and set text, video, and multimedia data.

Figure 4:
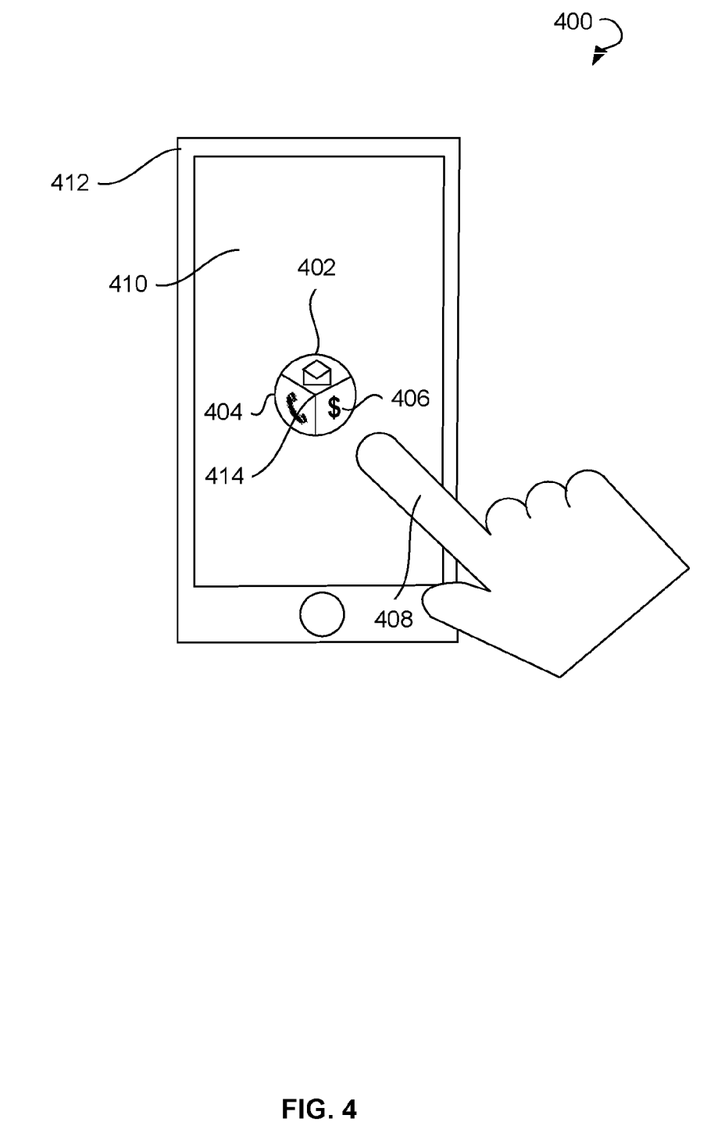
FIG. 4 is a block diagram illustrating a haptic control, in accordance with certain embodiments.

FIG. 4 is a block diagram 400 illustrating a haptic control, in accordance with certain embodiments. The haptic control 414 may be shown on the display 410 of the mobile and wearable device 412. The haptic control may include one or more mode selection elements. The mode selection elements may include a messaging mode 402, a calling mode 404, and a payment mode 406. A user 408 may give a haptic command (e.g. touch) to select a desired mode. If the user select the payment mode 406, a transaction request may be generated.

The transaction request may be generated using data of a mobile application or a page from which the payment mode is activated. For example, the user may activate the payment mode from a purchase page of an online store. The payment may be immediately initiated without requesting further details. Data of a payment recipient and a payment amount may be received from the actual page or application and financial information of the user may be stored in the database of the messaging, calling, and one-touch and one-scan payment and buying system 200. The user financial information may be provided by the user during registration with the messaging, calling, and one-touch and one-scan payment and buying system 200 and may include one or more of the following: bank account information, credit card information, debit card information, gift card information, prepaid card information, insurance account information, merchant account information, mobile currency information, digital money, and so forth. Online payments can be secured by two-factor authorization. One of the factors may be authorization on the integrated interface initiation, and the other factor may include locating the mobile and wearable device associated with the user and comparing the location with the location where the payment is requested.

Alternatively, the transaction request may be generated using data of a page associated with billing. In that case, the system 200 may generate a payment request using information extracted from the page as well as the financial information of the user stored in the system 200.

Transactions can be associated with transactional payments based on Unstructured Supplementary Service Data (USSD) or Short Message Service (SMS), direct operator billing, credit card mobile payments, online wallets, QR code payments, contactless near field communication (NFC), cloud-based mobile payments, audio signal-based payment, Bluetooth Low Energy (BLE) signal beacon payment, in-application payment, SDK payment, API payment, social networking payment, and direct carrier/bank co-operation.

Contactless NFC may be used to receive data for the payment request. For example, when the one touch and one-scan payment mode is selected, the user may make a payment for purchases in physical stores or transportation services. The mobile and wearable device may be equipped with a smart card. When a user waves the mobile and wearable device near a radar module, a payment is made. In some cases, the payment may require authentication. The NFC payment could be deducted from a pre-paid account or changed to a mobile or band account directly. NFC payment may include displaying a barcode on the mobile device screen for mobile payment. The payment barcode can include one or more of the following: a linear barcode, a two-dimensional barcode, a three-dimensional barcode, a machine readable code, and so forth.

The audio channel of the mobile phone may be another wireless interface that is used to receive data for a transaction request. Chip, ultra sound and acoustic features of the mobile and wearable device may support mobile payments. Near sound data transfer (NDST), data over voice and NFC produce audio signatures that the mobile phone can pick up to enable electronic transactions.

In some embodiments, the payment receiving transaction and the payment sending transaction are performed using a NFC. The NFC may be used to pair the mobile and wearable device and a merchant device by bringing the mobile and wearable device into proximity to the merchant device. The mobile and wearable device and the merchant device may be connected to a cloud network. The financial data and authorizing data associated with the user may be stored in the cloud network. In an example embodiment, upon pairing the mobile and wearable device with the merchant device, a Bluetooth connection between the mobile and wearable device and the merchant device may be established. The payment receiving transaction and the payment sending transaction may include at least a pear-to-pear transaction.

In some embodiments, a beacon mobile payment sends out a Bluetooth Low Energy (BLE) signal to anyone or any device with mobile application to transfer payment data and get electronic receipt. When a customer checks in, their picture and name may pop up on the retailer's point-of-sale system, when a sales associate at the store totals a bill on a cash register or a card-reading terminal, the beacon mobile payment user gives verbal confirmation to the associate, who matches the customer with the picture on the POS screen and concludes the transaction.

Figure 5:
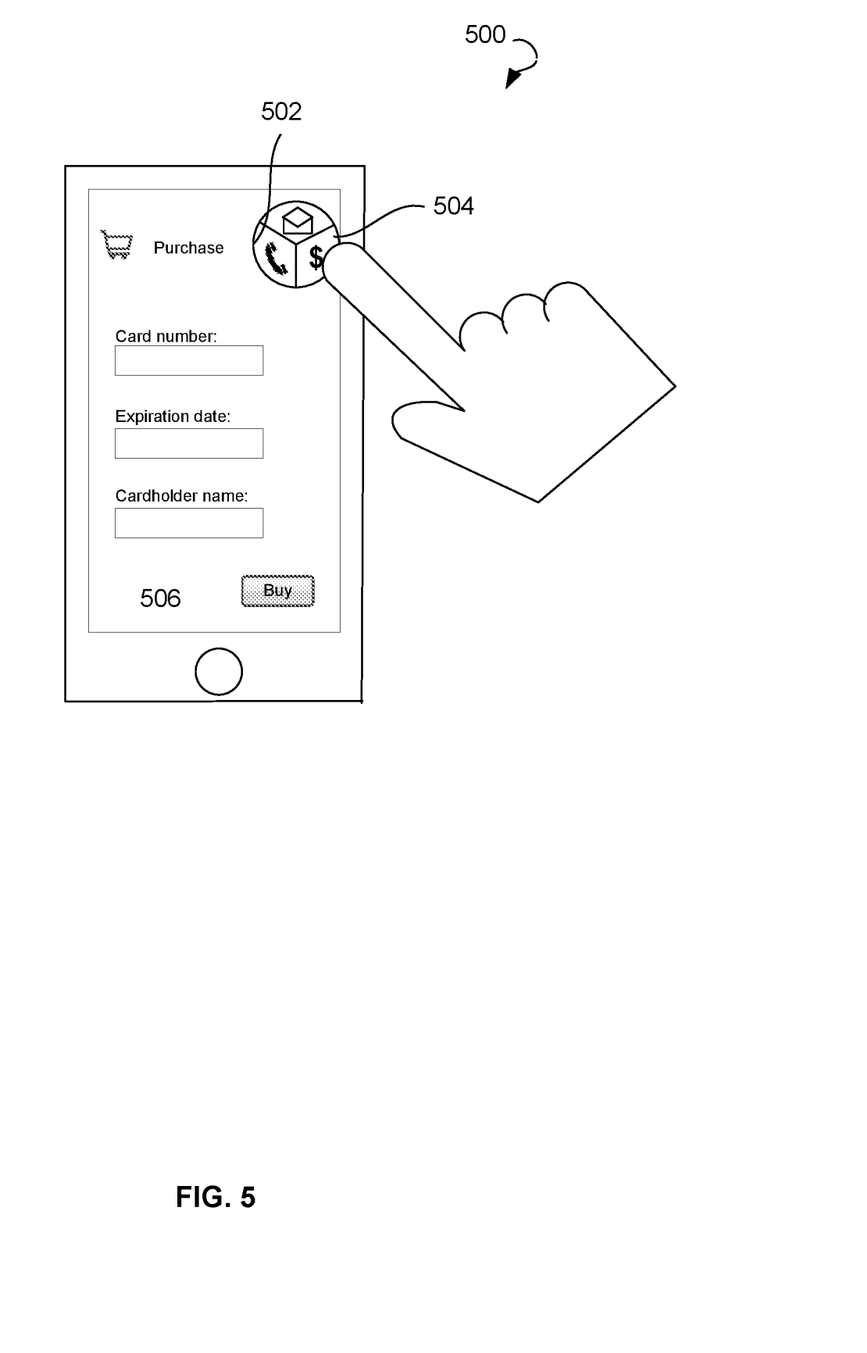
FIG. 5 is a block diagram illustrating a one-touch and one-scan payment and buying operation using the messaging, calling, and one-touch and one-scan payment and buying system, in accordance with certain embodiments.

FIG. 5 is a block diagram illustrating a one-touch payment operation 500 using the messaging, calling, and one-touch and one-scan payment system, in accordance with certain embodiments. The user selects a payment mode 504 using a one-touch button 502 (i.e. haptic control). The user selection may be transmitted to the system 200, and the system may determine information on a page 506 in view on the display. The system 200 may automatically provide financial information of the user on the page 506 and automatically initiate a payment.

Figure 6:
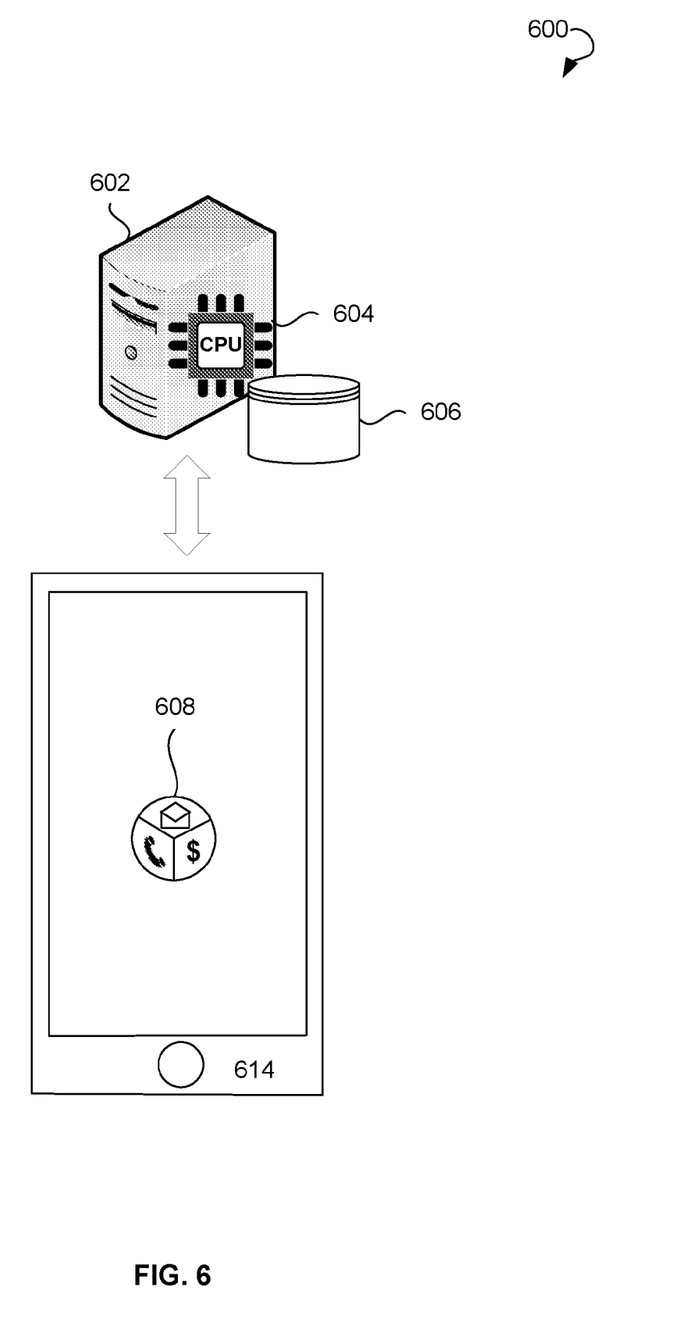
FIG. 6 is a block diagram showing various modules of a messaging, calling, and one-touch and one-scan payment and buying mobile service using a one-touch button, in accordance with certain embodiments.

FIG. 6 is a block diagram showing various modules of a messaging, calling, and one-touch payment and buying mobile platform shown as a messaging, calling, and one-touch payment mobile service 600 using a one-touch button 608, in accordance with certain embodiments. The messaging, calling, and one-touch payment mobile service 600 may include a central processing unit (CPU) 604, for example, associated with a remote server 602, a database 606 storing financial information of a user, and a one-touch button 608 presented on a device of the user. The CPU 604 may provide the one-touch button 608 on a display of a mobile and wearable device. The one-touch button 608 may overlap other visual elements on the display. The CPU 604 may receive a selection of the payment mode via the mode selection elements of the one-touch button 608 from a user. The selection may include a single touch of the user to the one-touch button 608. Upon the selection, the CPU 604 may extract context from the display of the mobile and wearable device to determine a payment transaction type which the user intends to perform. Based on the determining, the CPU 604 may send a transaction request to a financial institution using the extraction and financial data stored in the database 606 without requesting financial information, authorizing, or confirmations.

In some embodiments, the user may select one of the stored payment accounts to perform a payment. Authentication may be made when the user accesses the messaging, calling, and one-touch payment mobile service 600. The authentication may include password authentication, voice authentication, biometric authentication, and so forth.

Furthermore, using the messaging, calling, and one-touch payment mobile service 600 the user may create automatic payments. For example, the user may give instructions to transfer 1$ to a specific account every week day at 1:25 PM. The messaging, calling, and one-touch payment mobile service 600 may receive the instructions and automatically perform the payment according to the instructions. After a predefined period, for example, after one month, or every week, or every year, the messaging, calling, and one-touch payment mobile service 600 may prompt the user either to prolong the automatic payment or to cancel the payment.

Thus, various systems and methods for messaging, calling, and one-touch and one-scan payments and buying via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for messaging, calling, and one-touch payments and buying using a mobile and wearable device, the method comprising:

receiving, by a processor of the mobile and wearable device, payment information and authentication information associated with a user, the payment information being associated with a mobile payment account of the user in a messaging, calling, and one-touch payment and buying system, and the authentication information uniquely identifying the user;

generating, by the processor, a unique code, the unique code encoding the payment information;

providing, the processor, the unique code to the user, wherein the unique code is associated with the user, and wherein the unique code is displayed on the mobile and wearable device and encodes at least bank account information, a total price, merchant data, and a user phone number;

providing, by the processor, in response to the receiving of the authentication information, a haptic control associated with the messaging, calling, and one-touch payment and buying system, wherein the haptic control comprises a graphic image shown on a display of the mobile and wearable device overlapping other visual elements on the display, the haptic control providing mode selection elements associated with a payment mode, a messaging mode, and a calling mode, wherein the haptic control is compatible with other programs installed on the mobile and wearable device associated with the payment mode, the messaging mode, and the calling mode;

superimposing, by the processor, the haptic control on the display of the mobile and wearable device on top of all content displayable of the mobile and wearable device from the other programs, and using the haptic control within the other programs to facilitate at least one of performing payments, messaging, and calling associated with the payment mode, the messaging mode, and the calling mode of the mobile and wearable device;

receiving, by the processor, a selection of the payment mode via the mode selection elements of the haptic control from the user, wherein the selection of the payment mode includes a single touching of the mode selection elements associated with the payment mode;

upon the selection, automatically extracting, by the processor, context from at least one of the other installed programs from the display of the mobile and wearable device, wherein the context includes a web page, an application screen, or a message in view on the display;

based on the context, automatically determining, by the processor, a payment transaction type which the user intends to perform, wherein the payment transaction type includes a payment receiving transaction and a payment sending transaction;

when the determined payment transaction type is the payment receiving transaction, automatically sending a transaction request to a financial institution without requesting financial information, authorizing, or confirmations, wherein the transaction request associated with the payment receiving transaction includes at least the unique code, and receiving a payment from the financial institution, wherein subsequent to the selection of the payment mode, the payment receiving transaction is automatically performed with no further input by the user after the selection;

when the determined payment transaction type is the payment sending transaction, calculating, by the processor, a deposit amount associated with the payment sending transaction related to the user and sending a transaction request associated with the payment sending transaction to the financial institution, wherein the transaction request associated with the payment sending transaction includes at least the unique code, wherein the deposit amount amounts to a predetermined percent from the payment amount, and wherein the deposit amount is associated with the mobile payment account of the user in the messaging, calling, and one-touch payment and buying system, and sending a payment from the user to the financial institution, wherein subsequent to the selection of the payment mode, the payment sending transaction is automatically performed with no further input by the user after the selection;

receiving, by the processor, a notification about a further payment sending transaction of the user via the mobile payment service, the notification including at least the unique code and a payment amount of the further payment sending transaction;

providing at least one of a compensation, a rebate, a cashback, and a reward from the deposit amount to the user, the at least one of the compensation, the rebate, the cashback, and the reward being associated with the payment amount associated with the further payment sending transaction and not associated with the payment sending transaction, wherein the at least one of the compensation, the rebate, the cashback, and the reward amounts to the predetermined percent from the payment amount;

receiving, by the processor, a selection of the messaging mode via the mode selection elements of the haptic control from the user, wherein the selection of the messaging mode includes a single touching of the mode selection elements associated with the messaging mode;

when the selection of the messaging mode is received, providing, by the processor, a messaging interface on the display of the mobile and wearable device to enable the user to provide, via the messaging interface, a message and a selection of a recipient, the selection of the messaging mode being performed via touching the mode selection elements associated with the messaging mode by the user;

upon receipt of the message and the selection of the recipient, sending, by the processor, the message to the recipient via a data network;

receiving, by the processor, a selection of the calling mode via the mode selection elements of the haptic control from the user, wherein the selection of the calling mode includes a single touching of the mode selection elements associated with the calling mode;

when a selection of the calling mode is received, providing, by the processor, a calling interface on the display of the mobile and wearable device, to enable the user to provide, via the calling interface, a call recipient, the selection of the calling mode being performed via touching the mode selection elements associated with the calling mode by the user; and upon receipt of the call recipient, performing, by the processor, a call with the call recipient via the data network.

2. The method of claim 1, wherein the haptic control is integrated with at least one mobile application associated with the mobile and wearable device.

3. The method of claim 1, wherein the financial data and authorizing data associated with the user is provided by the user during registration and stored in the messaging, calling, and one-touch payment and buying system.

4. The method of claim 1, wherein the determining includes parsing of the context extracted from the display.

5. The method of claim 1, wherein the call is performed via a Voice over Internet Protocol (VoIP) service, the VoIP service being provided via Wi-Fi, 3G network, 4G network, 5G network, 6G network or upper.

6. The method of claim 1, wherein the call is selected from a group comprising: an audio call, a video call, and a holographic video call.

7. The method of claim 1, wherein the financial information includes one or more of the following: bank account information, credit card information, debit card information, gift card information, prepaid card information, insurance account information, merchant account information, mobile currency information, and digital money.

8. The method of claim 1, wherein the transaction request is associated with a virtual currency.

9. A messaging, calling, and one-touch payment and buying system comprising:

a mobile and wearable device comprising a processor configured to:

receive payment information and authentication information associated with a user, the payment information being associated with a mobile payment account of the user in the messaging, calling, and one-touch payment and buying system, and the authentication information uniquely identifying the user;

generate a unique code, the unique code encoding the payment information;

provide the unique code to the user, wherein the unique code is associated with the user, and wherein the unique code is displayed on a mobile and wearable device and encodes at least bank account information, a total price, merchant data, and a user phone number;

provide, in response to the receiving of the authentication information, a haptic control associated with the messaging, calling, and one-touch payment and buying system, wherein the haptic control comprises a graphic image shown on a display of the mobile and wearable device overlapping other visual elements on the display, the haptic control providing mode selection elements associated with a payment mode, a messaging mode, and a calling mode, wherein the haptic control is compatible with other programs installed on the mobile and wearable device associated with the payment mode, the messaging mode, and the calling mode;

superimpose the haptic control on the display of the mobile and wearable device on top of all content displayable of the mobile and wearable device from the other programs, and use the haptic control within the other programs to facilitate at least one of performing payments, messaging, and calling associated with the payment mode, the messaging mode, and the calling mode of the mobile and wearable device;

receive a selection of the payment mode via the mode selection elements of the haptic control from the user, wherein the selection of the payment mode includes a single touching of the mode selection elements associated with the payment mode;

upon the selection, automatically extract context from at least one of the other installed programs from the display of the mobile and wearable device, wherein the context includes a web page, an application screen, or a message in view on the display;

based on the context, automatically determine a payment transaction type which the user intends to perform, wherein the payment transaction type includes a payment receiving transaction and a payment sending transaction; and when the determined payment transaction type is the payment receiving transaction, automatically send a transaction request to a financial institution using the extraction without requesting financial information, authorizing, or confirmations, wherein the transaction request associated with the payment receiving transaction includes the unique code, and receive a payment from the financial institution, wherein subsequent to the selection of the payment mode, the payment receiving transaction is automatically performed with no further input by the user after the selection;

when the determined payment transaction type is the payment sending transaction, calculate a deposit amount associated with the payment sending transaction related to the user and send a transaction request associated with the payment sending transaction to the financial institution, wherein the transaction request associated with the payment sending transaction includes at least the unique code, wherein the deposit amount amounts to a predetermined percent from the payment amount, and wherein the deposit amount is associated with the mobile payment account of the user in the messaging, calling, and one-touch payment and buying system, and send a payment from the user to the financial institution, wherein subsequent to the selection of the payment mode, the payment sending transaction is automatically performed with no further input by the user after the selection;

receive a notification about a further payment sending transaction of the user via the mobile payment service, the notification including at least the unique code and a payment amount of the further payment sending transaction;

provide at least one of a compensation, a rebate, a cashback, and a reward from the deposit amount to the user, the at least one of the compensation, the rebate, the cashback, and the reward being associated with the payment amount associated with the further payment sending transaction and not associated with the payment sending transaction, wherein the at least one of the compensation, the rebate, the cashback, and the reward amounts to the predetermined percent from the payment amount;

receive a selection of the messaging mode via the mode selection elements of the haptic control from the user, wherein the selection of the messaging mode includes a single touching of the mode selection elements associated with the messaging mode;

when the selection of the messaging mode is received, provide a messaging interface on the display of the mobile and wearable device to enable the user to provide, via the messaging interface, a message and a selection of a recipient, the selection of the messaging mode being performed via touching the mode selection elements associated with the messaging mode by the user;

upon receipt of the message and the selection of the recipient, send the message to the recipient via a data network;

receive a selection of the calling mode via the mode selection elements of the haptic control from the user, wherein the selection of the calling mode includes a single touching of the mode selection elements associated with the calling mode;

when a selection of the calling mode is received, provide a calling interface on the display of the mobile and wearable device, to enable the user to provide, via the calling interface, a call recipient, the selection of the calling mode being performed via touching the mode selection elements associated with the calling mode by the user; and upon receipt of the call recipient, perform a call with the call recipient via the data network; and a database in communication with the processor, the database configured to store at least the financial information.

10. The system of claim 9, wherein the haptic control is integrated with at least one mobile application associated with the mobile and wearable device, wherein the at least one mobile application is integrated into a software development kit and an operating system of the mobile and wearable device, wherein the operating system is selected from a group comprising: iOS, Android, and Windows Phone, wherein, upon launching of the at least one mobile application by the user, the user is prompted to log in and asked to provide a consent that the at least one mobile application initiates future payments on behalf of the user, wherein during further purchases the at least one mobile application is launched by default without a need for a further action from the user to initiate launching of the at least one mobile application, the further action including entering a login and a password by the user, wherein the at least one mobile application is associated with performing payments and buying products or services in the Internet.

11. The system of claim 10, wherein upon launching of the at least one mobile application by the user, a list of payment cards is provided for selection by the user, the payment cards being associated with one or more of the following: a bank account, a bank mobile account, a service provider account, a digital currency, a universal national currency token interface, a national digital currency, and an electric payment card;

wherein upon the selection, a token is sent to the mobile and wearable device, the token being associated with a selected payment card, wherein further payments are performed using the token.

12. The system of claim 9, wherein the processor is further configured to download applications, receive and set text, video, and multimedia data.

13. The system of claim 9, wherein the processor is further configured to: authenticate an identity of the user, the authenticating including one or more of a password authentication, a voice authentication, and a biometric authentication, wherein the biometric authentication includes one or more of a fingerprint authentication, an iris pattern authentication, a heartbeat authentication, and a vein pattern identification; wherein the vein pattern identification is performed using scanning of one or more of the following: a palm vein pattern, a wrist vein pattern, a hand vein pattern, a leg vein pattern, a foot vein pattern, a neck vein pattern, and a head vein pattern; wherein the fingerprint authentication includes scanning fingerprints swiped across one or more or the following: a screen of the mobile and wearable device, a button of the mobile and wearable device, and a rear panel of the mobile and wearable device.

14. The system of claim 9, wherein the payment receiving transaction and the payment sending transaction are performed using a near field communication (NFC), wherein the NFC is used to pair the mobile and wearable device and a merchant device by bringing the mobile and wearable device into proximity to the merchant device, wherein the mobile and wearable device and the merchant device are connected to a cloud network, wherein the financial data and authorizing data associated with the user are stored in the cloud network, wherein upon pairing the mobile and wearable device with the merchant device a Bluetooth connection between the mobile and wearable device and the merchant device is established, wherein the payment receiving transaction and the payment sending transaction include at least a pear-to-pear transaction.

15. The system of claim 9, wherein the processor is further operable to receive, based on the determining the payment transaction type which the user intends to perform, data of a payment card associated with the user, wherein the data of the payment card are received by scanning the payment card, the payment card being scanned by a camera of the mobile and wearable device by positioning the payment card in proximity to camera of the mobile and wearable device, wherein the payment card is associated with one or more of the following: a bank account of the user and a virtual currency account of the user, wherein the bank account of the user and the virtual currency account of the user are linked to a mobile and wearable device number.

16. The system of claim 15, wherein the processor is further operable to store the data of the payment card into a cloud network, wherein the data of the payment card are stored in the cloud network as a token.

17. The system of claim 9, wherein the processor is further operable to receive product data based on scanning of the product data by the mobile and wearable device associated with the user, the product data being associated with one or more products;
calculate a total price for the one or more products; and
receive merchant data, wherein the merchant data are received by scanning a code associated with the merchant, wherein a scanned code associated with the merchant includes at least a Quick Response (QR) code associated with the merchant, wherein the QR-code associated with the merchant is stored in the mobile and wearable device of the user, wherein the QR-code associated with the merchant encodes at least a merchant account number.

18. The system of claim 17, wherein the processor is further operable to:
determine that the total price for the one or more products exceeds a predetermined price; and
based on the determining, send a notification to a merchant, wherein the payment sending transaction includes sending a payment from a phone account of the user to a merchant account.

19. The system of claim 9, wherein the payment receiving transaction and the payment sending transaction are performed using pairing the mobile and wearable device and a merchant device using a reader, the reader being connected to the merchant device and plugged into the mobile and wearable device.

20. A messaging, calling, and one-touch payment and buying mobile system using a one-touch button of a mobile and wearable device comprising:
a processor of the mobile and wearable device configured to:
receive payment information and authentication information associated with a user, the payment information being associated with a mobile payment account of the user in the messaging, calling, and one-touch payment and buying platform, and the authentication information uniquely identifying the user;
generate a unique code, the unique code encoding the payment information;
provide the unique code to the user, wherein the unique code is associated with the user, and wherein the unique code is displayed on the mobile and wearable device and encodes at least bank account information, a total price, merchant data, and a user phone number;
in response to the receiving of the authentication information, provide the one-touch button associated with the messaging, calling, and one-touch payment and buying mobile platform, wherein the one-touch button includes a graphic image shown on a display of a mobile and wearable device, the one-touch button overlapping other visual elements on the display, and wherein the one-touch button includes mode selection elements associated with a payment mode, a messaging mode, a calling mode, and a multimedia capture mode, wherein the one-touch button is compatible with other programs installed on the mobile and wearable device associated with the payment mode, the messaging mode, and the calling mode;
superimpose the one-touch button on the display of the mobile and wearable device on top of all content displayable of the mobile and wearable device from the other programs, and use the one-touch button within the other programs to facilitate at least one of performing payments, messaging, and calling associated with the payment mode, the messaging mode, and the calling mode of the mobile and wearable device;
receive a selection of the payment mode via the mode selection elements of the one-touch button from the user, wherein the selection of the payment mode includes a single touching of the mode selection elements associated with the payment mode;
upon the selection, automatically extract context from at least one of the other installed programs from the display of the mobile and wearable device, wherein the context includes a web page, an application screen, or a message in view on the display, and wherein the extraction includes one or more of the following: a payment recipient, a payer account, a sender account, and a payment amount;
based on the context, automatically determine a payment transaction type which the user intends to perform, wherein the payment transaction type includes a payment receiving transaction and a payment sending transaction;
when the determined payment transaction type is the payment receiving transaction, automatically send a transaction request to a financial institution using the extraction without requesting financial information, authorizing, or confirmations, wherein the transaction request associated with the payment receiving transaction includes at least the unique code, and receive a payment from the financial institution, wherein subsequent to the selection of the payment mode, the payment receiving transaction is automatically performed with no further input by the user after the selection;

when the determined payment transaction type is the payment sending transaction, calculate a deposit amount associated with the payment sending transaction related to the user and sending a transaction request associated with the payment sending transaction to the financial institution, wherein the transaction request associated with the payment sending transaction includes at least the unique code, wherein the deposit amount amounts to a predetermined percent from the payment amount, and wherein the deposit amount is associated with the mobile payment account of the user in the messaging, calling, and one-touch payment and buying system, and sending a payment from the user to the financial institution, wherein subsequent to the selection of the payment mode, the payment sending transaction is automatically performed with no further input by the user after the selection;

receive a notification about a further payment sending transaction of the user via the mobile payment service, the notification including at least the unique code and a payment amount of the further payment sending transaction;

provide at least one of a compensation, a rebate, a cashback, and a reward from the deposit amount to the user, the at least one of the compensation, the rebate, the cashback, and the reward being associated with the payment amount associated with the further payment sending transaction and not associated with the payment sending transaction, wherein the at least one of the compensation, the rebate, the cashback, and the reward amounts to the predetermined percent from the payment amount;

receive a selection of the messaging mode via the mode selection elements of the one-touch button from the user, wherein the selection of the messaging mode includes a single touching of the mode selection elements associated with the messaging mode;

when the selection of the messaging mode is received, provide a messaging interface on the display of the mobile and wearable device to enable the user to provide, via the messaging interface, a message and a selection of a recipient, the selection of the messaging mode being performed via touching the mode selection elements associated with the messaging mode by the user;

upon receipt of the message and the selection of the recipient, send the message to the recipient via a data network;

receive a selection of the calling mode via the mode selection elements of the haptic control from the user, wherein the selection of the calling mode includes a single touching of the mode selection elements associated with the calling mode;

when a selection of the calling mode is received, provide a calling interface on the display of the mobile and wearable device, to enable the user to provide, via the calling interface, a call recipient, the selection of the calling mode being performed via touching the mode selection elements associated with the calling mode by the user; and upon receipt of the call recipient, perform a call with the call recipient via the data network; and a database in communication with the processor, the database configured to store at least the financial information.

21. The system of claim 20, wherein the one-touch button is integrated with at least one mobile application associated with the mobile and wearable device, a point of sale device, a currency token service, and electronic payment card.

22. The system of claim 20, wherein the processor is further configured to:
receive a selection of the multimedia capture mode;
upon the selection, initiate one or more sensors to capture multimedia to obtain captured multimedia;
analyze the single touch of the user to the section element of the one-touch button associated with the multimedia capture mode to determine a duration of the single touch;
based on the analysis, determine a type of the multimedia to be recorded, wherein the type of the multimedia includes an image and a video recording; and
record the captured multimedia to the database.

23. The system of claim 20, wherein the at least one mobile application is integrated into a software development kit and an operating system of the mobile and wearable device, wherein the operating system is selected from a group comprising: iOS, Android, and Windows Phone,
wherein, upon launching of the at least one mobile application by the user, the user is prompted to log in and asked to provide a consent that the at least one mobile application initiates future payments on behalf of the user,
wherein during further purchases the at least one mobile application is launched by default without a need for a further action from the user to initiate launching of the at least one mobile application, the further action including entering a login and a password by the user,
wherein the at least one mobile application is associated with performing payments and buying products or services in the Internet.

24. The system of claim 23, wherein upon launching of the at least one mobile application by the user, a list of payment cards is provided for selection by the user, the payment cards being associated with one or more of the following: a bank account, a bank mobile account, a service provider account, a digital currency, a universal national currency token interface, a national digital currency, and an electric payment card; wherein upon the selection, a token is sent to the mobile and wearable device, the token being associated with a selected payment card, wherein further payments are performed using the token.

25. The system of claim 20, wherein a payment receiving transaction and a payment sending transaction are performed using an NFC, wherein the NFC is used to pair the mobile and wearable device and a merchant device by bringing the mobile and wearable device into proximity to the merchant device, wherein the mobile and wearable device and the merchant device are connected to a cloud network, wherein the financial data and authorizing data associated with the user are stored in the cloud network, wherein upon pairing the mobile and wearable device with the merchant device a Bluetooth connection between the mobile and wearable device and the merchant device is established, wherein the payment receiving transaction and the payment sending transaction include at least a pear-to-pear transaction.

* * * * *